(12) United States Patent
Hannan et al.

(10) Patent No.: US 6,539,398 B1
(45) Date of Patent: Mar. 25, 2003

(54) OBJECT-ORIENTED PROGRAMMING MODEL FOR ACCESSING BOTH RELATIONAL AND HIERARCHICAL DATABASES FROM AN OBJECTS FRAMEWORK

(75) Inventors: Richard G. Hannan, San Jose, CA (US); Shyh-Mei Fang Ho, Cupertino, CA (US); Vern L. Watts, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,336

(22) Filed: Mar. 31, 2000

Related U.S. Application Data

(63) Continuation-in-part of application No. 09/538,930, filed on Mar. 31, 2000, and a continuation-in-part of application No. 09/097,376, filed on Jun. 15, 1998, now Pat. No. 6,192,369, and a continuation-in-part of application No. 09/070,528, filed on Apr. 30, 1998, and a continuation-in-part of application No. 09/070,274, filed on Apr. 30, 1998, now Pat. No. 6,360,229, and a continuation-in-part of application No. 09/070,273, filed on Apr. 30, 1998, now Pat. No. 6,128,611, and a continuation-in-part of application No. 09/070,227, filed on Apr. 30, 1998, now Pat. No. 6,128,619, and a continuation-in-part of application No. 09/070,071, filed on Apr. 30, 1998, now Pat. No. 6,202,069.

(51) Int. Cl.[7] .............................................. G06F 17/30
(52) U.S. Cl. ................................................. 707/103 R
(58) Field of Search ............................ 707/1, 10, 2, 4, 707/102, 103 R, 100; 709/203; 717/122, 137

(56) References Cited

U.S. PATENT DOCUMENTS

| | | | |
|---|---|---|---|
| 5,548,779 A | 8/1996 | Andert et al. | 709/203 |
| 5,594,899 A | 1/1997 | Knudsen et al. | 707/2 |
| 5,737,597 A | 4/1998 | Blackman et al. | 707/102 |
| 5,794,247 A | 8/1998 | Blackman et al. | 707/103 R |
| 5,794,248 A | 8/1998 | Blackman et al. | 707/103 R |
| 5,799,313 A | 8/1998 | Blackman et al. | 707/103 R |
| 6,128,619 A | * 10/2000 | Fogarasi et al. | 707/10 |
| 6,192,369 B1 | * 2/2001 | Doan et al. | 707/1 |
| 6,202,069 B1 | * 3/2001 | Blackman et al. | 707/100 |
| 6,360,229 B2 | * 3/2002 | Blackman et al. | 707/103 R |

OTHER PUBLICATIONS

Madjid, M. et al., "Specification of the Database Behavior Through the Active Object Paradigm", Proceedings: Seventh International Workshop on Database and Expert Systems Applications, 1996, pp. 141–146 (1–page Abstract).

Davis, J., et al., "Integrated Modeling Implementation Using Object–Relational Database Systems", Proceedings of the Fourth Annual Workshop on Information Technologies and Systems, WITS 1994, pp. 185–194 (1–page Abstract).

* cited by examiner

Primary Examiner—Diane D. Mizrahi
Assistant Examiner—Apu M Mofiz
(74) Attorney, Agent, or Firm—Gates & Cooper LLP

(57) ABSTRACT

A method, apparatus, and article of manufacture for accessing a database. A hierarchical database system is modeled into an objects framework, wherein the objects framework corresponds to one or more application views, database definitions, and data defined and stored in the hierarchical database system. The objects framework also provides mechanisms for accessing a relational database system, wherein the objects framework provides industry-standard interfaces for attachment to the relational database system. Transactions from an application program for both the hierarchical database system and the relational database system are processed through the objects framework using message queue objects.

30 Claims, 3 Drawing Sheets

OBJECT-ORIENTED PROGRAMMING MODEL FOR ACCESSING BOTH RELATIONAL AND HIERARCHICAL DATABASES FROM AN OBJECTS FRAMEWORK

CROSS-REFERENCE TO RELATED APPLICATIONS

This application is a continuation-in-part of the following co-pending and commonly assigned patent applications:

Utility application Ser. No. 09/538,930, entitled "AN OBJECT-ORIENTED PARADIGM FOR ACCESSING SYSTEM SERVICE REQUESTS BY MODELING SYSTEM SERVICE CALLS INTO AN OBJECT FRAMEWORK," filed on Mar. 31, 2000, by Bach D. Doan, Shyh-Mei F. Ho, and John R. Shelton;

Utility application Ser. No. 09/097,376, entitled "AN OBJECT-ORIENTED PARADIGM FOR ACCESSING TRANSACTIONAL REQUESTS BY MODELING I/O MESSAGE QUEUES INTO AN OBJECT FRAMEWORK," filed on Jun. 15, 1998, by Bach D. Doan, Shyh-Mei F. Ho, and Jenny Y. Liao, now U.S. Pat. No. 6,192,369, issued on Feb. 20, 2001;

Utility application Ser. No. 09/070,071, entitled "AN EXECUTION PARADIGM FOR ACCESSING HIERARCHICAL DATA USING AN OBJECT FRAMEWORK," filed on Apr. 30, 1998, by Kenneth R. Blackman, Shyh-Mei F. Ho, and Thomas Beavers Sander, now U.S. Pat. No. 6,202,069, issued on Mar. 13, 2001;

Utility application Ser. No. 09/070,274, entitled "A GENERIC EXECUTION MODEL FOR ISOLATING APPLICATIONS FROM UNDERLYING DATABASES," filed on Apr. 30, 1998, by Kenneth R. Blackman, Shyh-Mei F. Ho, and Thomas Beavers Sander, now U.S. Pat. No. 6,360,229, issued on Mar. 19, 2002;

Utility application Ser. No. 09/070,528, entitled "AN OBJECT-ORIENTED PROGRAMMING MODEL FOR ACCESSING HIERARCHICAL DATABASES," filed on Apr. 30, 1998, by Bach Dinh Doan and Shyh-Mei F. Ho;

Utility application Ser. No. 09/070,273, entitled "AN INTERNET-ENABLED GENERIC APPLICATION PROGRAM FOR ACCESSING HIERARCHICAL DATA," filed on Apr. 30, 1998, by Bach Dinh Doan and Shyh-Mei F. Ho, now U.S. Pat. No. 6,128,611, issued on Oct. 3, 2000; and Utility application Ser. No. 09/070,227, entitled "GENERATING AN INTERNET APPLICATION FOR ACCESSING A HIERARCHICAL DATABASE," filed on Apr. 30, 1998, by Attila J. Fogarasi, Shyh-Mei F. Ho, Wai-Lee D. Ling, and Kevin M. McBride, now U.S. Pat. No. 6,128,619, issued on Oct. 3, 2000;

all of which applications are incorporated by reference herein.

This application is related to the following co-pending and commonly assigned patent applications:

Utility application Ser. No. 09/042,238, entitled "A USER INTERFACE FOR CREATING PROGRAM SPECIFICATIONS FOR ACCESSING DATABASE PERSISTENT OBJECTS," filed on Mar. 13, 1998, by Mark A. Bach, Ia Ha Chung, John K. Flanigan, Candace A. Garcia, Judith E. Hill, Steve T. Kuo, Theresa H. Lai, Kevin M. McBride, and H. Moncrief Rowe-Anderson, now U.S. Pat. No. 6,128,622, issued on Oct. 3, 2000, which claims the benefit under 35 U.S.C. §119(e) of Provisional Application Serial No. 60/067,292, entitled "A USER INTERFACE FOR CREATING PROGRAM SPECIFICATIONS FOR ACCESSING DATABASE PERSISTENT OBJECTS," filed on Nov. 26, 1997, by Mark A. Bach, In Ha Chung, John K. Flanigan, Candace A. Garcia, Judith E. Hill, Steve T. Kuo, Theresa H. Lai, Kevin M. McBride, and H. Moncrief Rowe-Anderson;

Utility application Ser. No. 08/775,606, entitled "IMS/WWW MAPPING SYSTEM," filed on Dec. 31, 1996, by Mark Alan Bach, In Ha Chung, Judith E. Hill, Steve T. Kuo, Teresa H. Lai, Allen G. Lee, and Richard S. Uyehara, now U.S. Pat. No. 5,781,739, issued on Jul. 14, 1998;

Utility application Ser. No. 09/074,928, entitled "A FRAMEWORK FOR OBJECT-ORIENTED ACCESS TO NON-OBJECT-ORIENTED DATABASES," filed on May 6, 1998, by Kenneth R. Blackman and Jack L. Howe III, now U.S. Pat. No. 6,081,808, issued on Jun. 27, 2000, which is a continuation of Utility application Ser. No. 08/736,762, entitled "A FRAMEWORK FOR OBJECT-ORIENTED ACCESS TO NON-OBJECT-ORIENTED DATABASES," filed on Oct. 25, 1996, by Kenneth R. Blackman and Jack L. Howe III, now U.S. Pat. No. 5,799,313, issued on Aug. 25, 1998; and Utility application Ser. No. 09/047,786, entitled "A METHOD FOR CATALOGING DATABASE CHARACTERISTICS AND DEFINING AND GENERATING DATABASE PERSISTENT OBJECTS," filed on Mar. 25, 1998, by Kenneth R. Blackman and Jack L. Howe III, now U.S. Pat. No. 6,223,184, issued on Apr. 24, 2001, which is a continuation of Utility application Ser. No. 08/736,765, entitled "A METHOD FOR CATALOGING DATABASE CHARACTERISTICS AND DEFINING AND GENERATING DATABASE PERSISTENT OBJECTS," filed on Oct. 25, 1996, by Kenneth R. Blackman and Jack L. Howe III, now U.S. Pat. No. 5,737,597, issued on Apr. 7, 1998; all of which applications are incorporated by reference herein.

BACKGROUND OF THE INVENTION

1. Field of the Invention

The present invention relates generally to computerized methods for accessing databases, and in particular, to an object-oriented method programming model for accessing both hierarchical and relational databases from an objects framework.

2. Description of Related Art

It is well known in the art to use database management systems, such as IBM's IMS™ (Information Management System) and DB2™ (DataBase 2) database management systems, to manage computerzed databases. Indeed, both IMS™ and DB2™ have been used for decades and remain in use today. Currently, there is a need to access such "legacy" databases using application programs developed by object-oriented programming systems (OOPS). However, there are few tools available to assist OOPS developers.

One method for allowing object-oriented application programs to access data in an IMS™ or DB2™ database is through transaction wrappering. Transaction wrappering creates a class having member functions or methods that retrieve data from the database, create an object embodying the retrieved data, and manipulate the object in an object-oriented application program. The problem with this approach is that each object-oriented application requires substantial additional coding, both object-oriented and non-object-oriented, before it is able to access the data in the database.

Another approach to accessing data in a non-relational, non-object-oriented database is to translate the non-relational database to a relational database, and use existing object-oriented programming techniques developed for relational databases to access the data therein. The problem with this approach is that non-relational data, such as found in hierarchical databases, does not map well to a relational database.

Thus, there is a need in the art for improved techniques for accessing hierarchical and relational databases using object-oriented frameworks.

SUMMARY OF THE INVENTION

To overcome the limitations in the prior art described above, and to overcome other limitations that will become apparent upon reading and understanding the present specification, the present invention discloses a method, apparatus, and article of manufacture for accessing a database. A hierarchical database system is modeled into an objects framework, wherein the objects framework corresponds to one or more application views, database definitions, and data defined and stored in the hierarchical database system. The objects framework also provides mechanisms for accessing a relational database system, wherein the objects framework provides industry-standard interfaces for attachment to the relational database system. Transactions from an application program for both the hierarchical database system and the relational database system are processed through the objects framework using message queue objects.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus m accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention introduces a new execution paradigm for accessing hierarchical and relational databases, such as IMS™ and DB2™ databases, by modeling the databases into an objects framework and providing the object-oriented mechanisms that allow object-oriented application programs to access the databases. The objects framework instantiates objects upon demand from application programs for various purposes, such as establishing attachments to the database management systems, accessing data in the databases, materializing the data in the objects, performing synchpoint processing, and issuing system services requests.

In one embodiment, the present invention provides the mechanisms used by application programs to access relational databases via industry standardized interfaces, such as ODBC (Open DataBase Connectivity), JDBC (Java DataBase Connectivity), and/or SQLJ (Java SQL). In the prior art, an object-oriented application program running under IMS™ could not access an RDBMS using ODBC, JDBC, or SQLJ.

The new execution paradigm also provides new application programing interfaces (APIs) for explicit synchpoint processing, wherein application programs are required to invoke commit or rollback member functions or methods before exiting or retrieving the next message from an input message queue. In the prior art, a procedural or object-oriented application program running under IMS™ could not perform explicit synchpoint processing.

These and other aspects of the present invention are described in more detail below.

Hardware Environment

Figure 1:
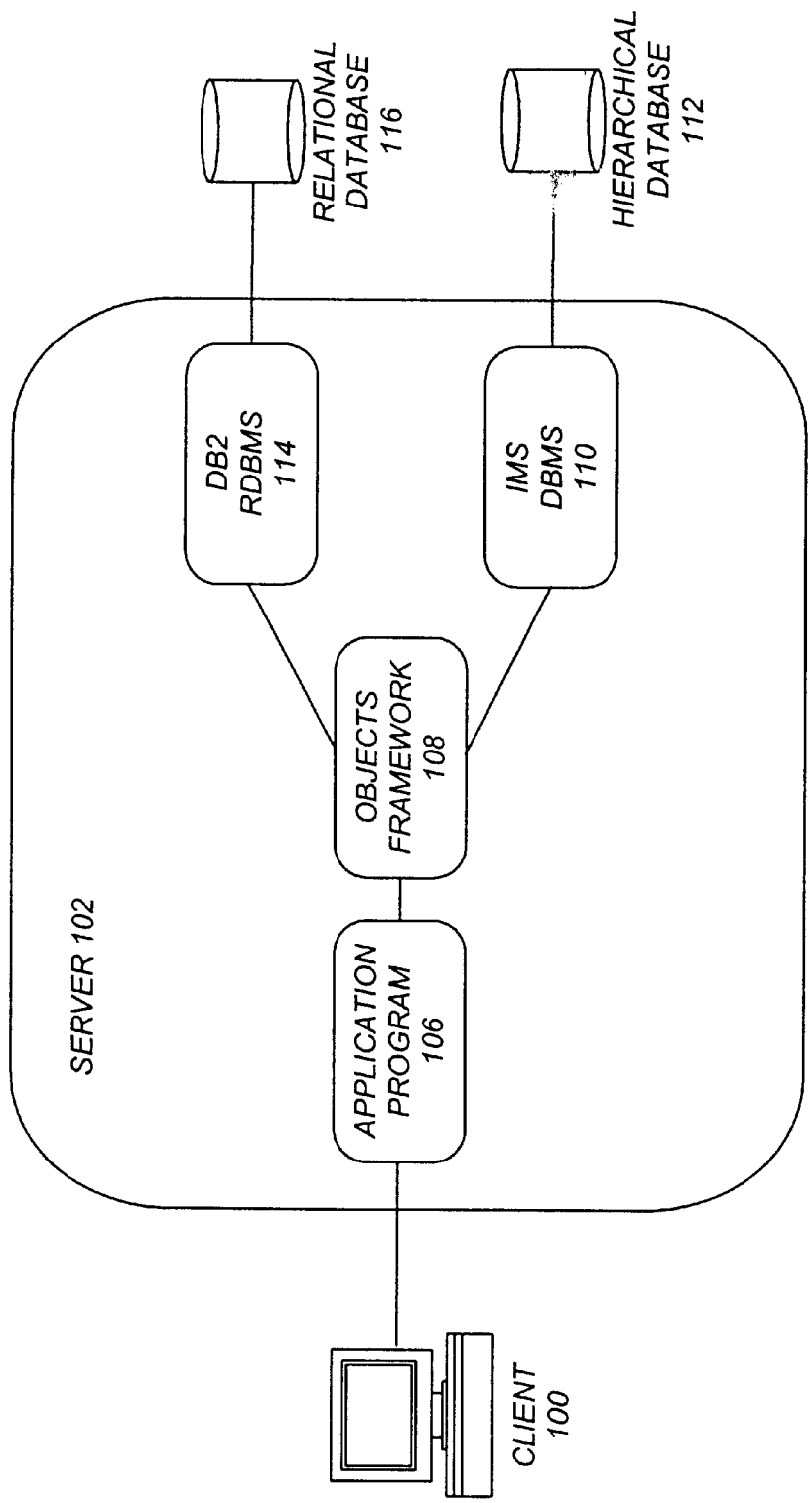
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components, such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, 110, and 114. These computer programs 106, 108, 110, and 114 receive requests from the client computer 100 for performing various functions and transmit data to the client computers 100 in response to the requests.

The server computer 102 manages one or more databases 112 and 116 stored on one or more data storage devices (such as a fixed or hard disk drive, a floppy disk drive, a CD-ROM drive, a tape drive, or other device). In a preferred embodiment, one database 112 is a hierarchical database managed by the IMS™ database management system (DBMS) offered by IBM Corporation, while another database 116 is a relational database managed by the DB2™ relational database management system (RDBMS) offered by IBM Corporation. Those skilled in the art will recognize, however, that the present invention may be applied to any database and associated database management system.

The present invention is generally implemented using seven major components executed by client computers 100 and server computers 102, including a client program 104, object-oriented application program 106, objects framework 108, IMS™ DBMS 110, hierarchical database 112, DB2™ RDBMS 114, and relational database 116, wherein each of these components comprise instructions and/or data. The client program 104 provides a user interface, the object-oriented application program 106 performs application functions, the objects framework 108 accesses data retrieved from the databases 112 and 116, the IMS™ DBMS 110 controls access to the hierarchical database 112, and the DB2™ RDBMS 114 controls access to the relational database 116.

Generally, these instructions and/or data 104–116 are all tangibly embodied in or retrievable from a computer-readable device, medium, carrier, or signal, e.g., a data storage device, a remote device accessible via a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the an will recognize that any combination of the above components, or any number of different components, including computer programs, peripherals, and other devices, may be used to implement the present invention, so long as similar functions are performed thereby.

Objects Framework Model

Figure 2:
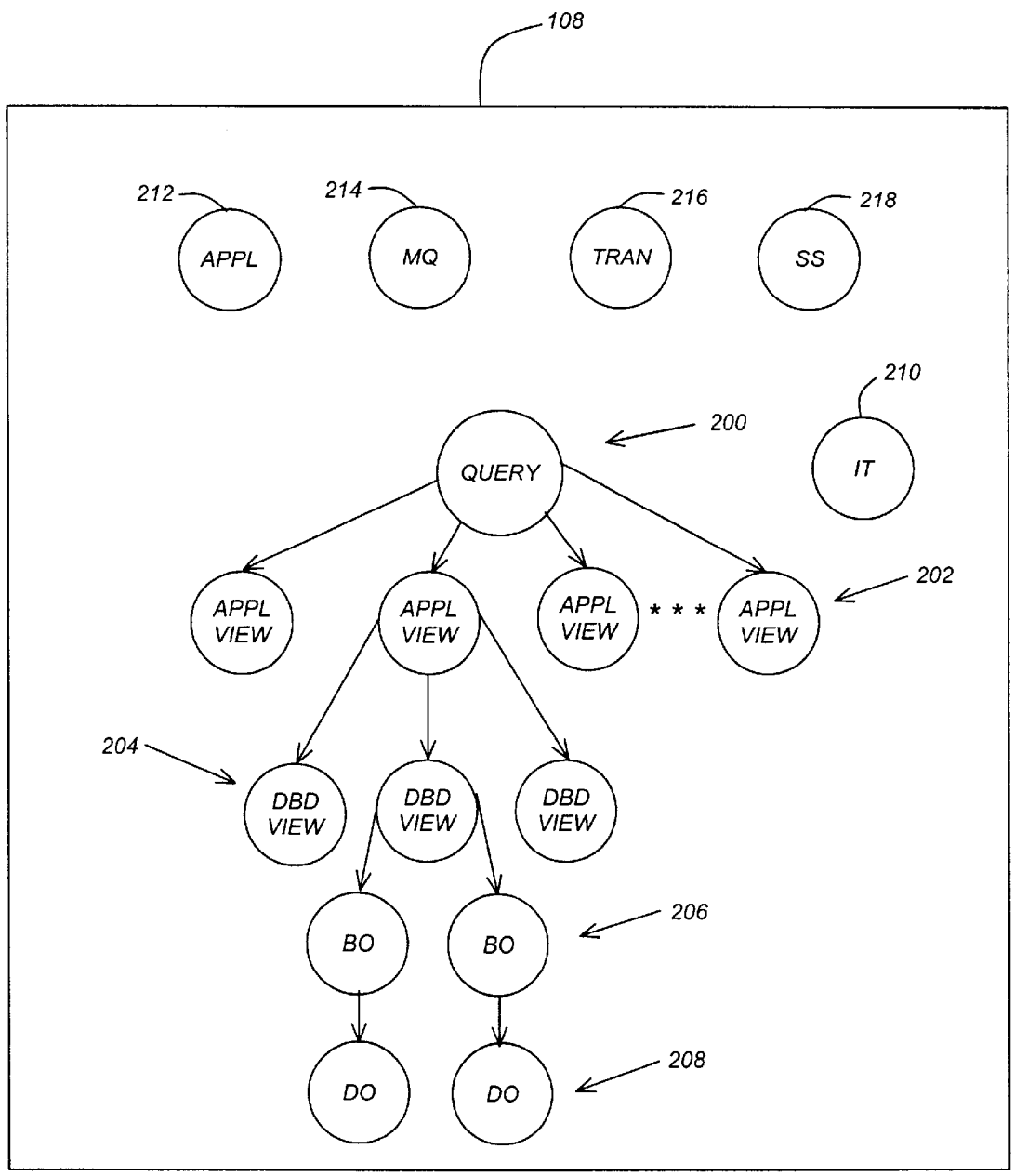
FIG. 2 is a block diagram illustrating a layered processing model used in the objects framework according to the present invention.

FIG. 2 is a block diagram illustrating the structure of the objects framework 108 according to the preferred embodiment of the present invention. The objects framework 108 comprises a class library that interfaces to the application program 106. The application program 106 dynamically loads previously defined objects into the objects framework 108 to access the databases 112 and 116 during execution. These previously defined objects include a layered processing model for IMS™ databases 112 that includes a query object 200, one or more applView objects 202, one or more dbdView objects 204, one or more business objects (BOs) 206, one or more data objects (DOs) 208, and an iterator object 210. In addition, the objects framework 108 supports IMS™ application initialization and termination by means of an application object 212, IMS™ Transaction Manager™ message queues by means of one or more message queue objects 214, IMS™ Transaction Manager™ synchpoint processing by means of a transaction object 216, and IMS™ system services by means of a system services object 218.

The application program 106 first loads the objects framework 108 class library. The application program 106 then instantiates an application object 212, and invokes an initialize( ) function of the application object 212 to set up the IMS™ environment, including an attachment to the DB2™ RDBMS 114, before the application program 106 requests IMS™ or DB2™ services. Thereafter, the objects framework 108 receives IMS™ and/or DB2™ transaction requests from a requester via one or more instantiated message queue objects 214.

If the request is an IMS™ request, the objects framework 108 then dynamically instantiates a query object 200, applView object 202, and dbdView object 204. The objects framework 108 also dynamically loads the class library for the BOs 206 and DOs 208 requested by the application program 106 to create an iterator object 210. The iterator object 210 instantiates the BOs 206 and their corresponding DOs 208 during execution.

The query object 200, applView object 202, dbdView object 204, BOs 206 and their corresponding DOs 208 are organized into a tree structure to represent the hierarchical structure of data retrieved from the IMS™ database 112. Each of the objects in the tree structure encapsulates a logical unit of data retrieved from the database 112 and includes member functions for manipulating the encapsulated data. In the preferred embodiment, the tree structure ensures that there is exactly one path through the hierarchy to each object and consequently exactly one identity, i.e., segment occurrence, for an object.

If the request is a DB2™ request, the application program 106 could use either ODBC (if a C++ application program 106), or JDBC/SQLJ (if a Java application program) to invoke the services of the DB2™ RDBMS 114. The DB2™ RDBMS 114 can be invoked after the initialize function of the application object 212 has established the attachment from the IMS™ environment to the DB2™ RDBMS 114.

After execution, responses are returned to the requester as IMS™ transaction responses via the instantiated message queue objects 216. Further, commit and rollback functions can be invoked via the instantiation of transaction objects 218. At any time, IMS™ system services can be invoked via the instantiation of system services objects 224.

Objects Framework Model

FIG. 2 is a block diagram illustrating a layered processing model provided by the objects framework 108 according to the present invention. The layered processing model corresponds to the application views, database definitions, and data defined and stored in the IMS™ DBMS 110. In addition, the objects framework 108 supports IMS™ application initialization and termination, IMS™ Transaction Manager™ message queues, IMS™ Transaction Manager™ synchronization functions, and IMS™ system services.

The objects framework 108 comprises an OO class library that interfaces to the application program 106. The application program 106 dynamically loads previously defined objects into the objects framework 108 to access the databases 112 and 116 during execution. To support IMS™, the objects loaded into the objects framework 108 include a query object 200, one or more applView objects 202, one or more dbdView objects 204, one or more business objects (BOs) 206, one or more data objects (DOs) 208, and an iterator object 210. In addition, the objects framework 108 includes an application object 212, one or more message queue objects 214, a transaction object 216, and a system services object 218.

The application program 106 first loads the objects framework 108 class library. The application program 106 then instantiates an application object 212, and invokes an initialize( ) function of the application object 212 to ensure that the IMS™ environment is set up, and an attachment is made to the DB2™ RDBMS 114, before the application program 106 requests IMS™ or DB2™ services. Thereafter, the objects framework 108 receives IMS™ and/or DB2™ transaction requests from a requester via one or more instantiated message queue objects 214.

If the request is an IMS™ request, the objects framework 108 then dynamically instantiates a query object 200, applView object 202, and dbdView object 204. The objects framework 108 also dynamically loads the class library for the BOs 206 and DOs 208 requested by the application program 106 to create an iterator object 210. The iterator object 210 instantiates the BOs 206 and their corresponding DOs 208 during execution.

The query object 200, applView object 202, dbdView object 204, BOs 206 and their corresponding DOs 208 are organized into a tree structure to represent the hierarchical structure of data retrieved from the IMS™ database 112. Each of the objects in the tree structure encapsulates a logical unit of data retrieved from the database 112 and includes member functions for manipulating the encapsulated data. In the preferred embodiment, the tree structure ensures that there is exactly one path through the hierarchy to each object and consequently exactly one identity, i.e., segment occurrence, for an object.

If the request is a DB2™ request, the application program 106 could use either ODBC (if a C++ application program 106), or JDBC/SQLJ (if a Java application program) to invoke the DB2™ RDBMS 114. The DB2™ RDBMS 114 can be invoked after the initialize function of the application object 212 has established the attachment from the IMS™ environment to the DB2™ RDBMS 114.

After execution, responses are returned to the requestor as IMS™ transaction responses via the instantiated message queue objects 216. Further, commit and rollback functions can be invoked via the instantiation of transaction objects 218. At anytime, IMS™ system services can be invoked via the instantiation of system services objects 224.

Query Object

In the preferred embodiment, the database 112 is an IMS™ database 112, which is an "application views database". The query object 200 is the root of the hierarchy maintained by the objects framework 108 for the IMS™ database 112, and thus is a root for a collection of application views (applView objects 202) in the IMS™ database 112. The objects framework 108 provides for multiple application views of the database 112 in a layered processing model.

applView Object

Each applView object 202 represents an "application (appl) view" of the IMS™ database 112. Each applView object 202 contains and manages a collection of dbdView objects 204.

dbdView Object

Each dbdView object 204 represents a "database description (dbd) view" associated with a given "application view" of the IMS™ database 112. Each dbdView object 204 includes information about the structure of the segments in the IMS™ database 112 and the record layouts, including formatting information for the records in the database 112. The dbdView objects 204 also define the hierarchy to help locate segments for the database 112. In the objects framework 108, each dbdView object 204 contains and manages a collection of DOs 206 and BOs 208.

Business Objects and Data Objects

The IMS™ database 112 is comprised of a collection of segment types, and each segment type contains a collection of segment occurrences. A DO 208 class represents each segment type and each segment occurrence is represented by an instance of the class, i.e., a DO 208. Thus, the DOs 208 provide a direct mapping of the data within each segment occurrence. Moreover, the object-oriented application program 106 can directly access the data of the segment occurrence by interacting with the DO 208 via the objects framework 108 to perform the necessary operations on the IMS™ database 112.

In addition, a BO 206 may be instantiated with a DO 208 to provide business logic for the application program 106. In such an embodiment, the application program 106 accesses the business logic via the BO 206, which in turn invokes the member functions or methods of its corresponding DO 208 to perform the necessary operations on the database 112, to manage its essential state data. Thus, the DO 208 isolates the BO 206 from the specifics of the IMS™ database 112. With the BO/DO model, customers can easily separate business logic from the physical data access logic to accommodate more diversified business needs.

Iterator Object

In the objects framework 108, the application program 106 uses a DL/I™ query string to access the IMS™ database 112. The application program 106 first instantiates a desired applView object 202. If the associated query object 200 has not been instantiated yet, this also results in its instantiation as the root for the collection of applView objects 202 in the IMS™ database 112. The application program 106 then provides the DL/I™ query string to an "evaluate" function of the applView object 202, and the applView object 202 builds a DL/I™ segment search argument list based on the values within the DL/I™ query string.

The application program 106 then creates an iterator (IT) object 210 that is used to point to an incrementally materialized collection of BOs 206 and DOs 208 that meet the search criteria specified in the DL/I™ query string. The "evaluate" function of the applView object 202 reads the DL/I™ query string and sets a pointer in the iterator object 210 to point to the collection of BOs 206 and DOs 208 that meet the DL/I™ segment search criteria.

A "next" function of the iterator object 210 is invoked to instantiate each BO 206 and/or DO 208 from the database 112, wherein the resulting state data of the BO 206 and DO 208 are cached in the memory of the server computer 102. Using the pointer and "next" function of the iterator object 202, the application program 106 can iterate through a collection of BOs 206 and/or DOs 208 to materialize one BO 206 and/or DO 208 after the other in the memory of the server computer 102.

Each BO 206 and DO 208 class contains both "get" and "set" functions associated with each class attribute. The application program 106 can then retrieve or update the attributes of a DO 208 by invoking these functions. Preferably, no I/O operations are performed at the invocation of these "get" and "set" functions, and all state data is changed in memory only until a commit occurs.

As described above, the BOs 206 are used by the application program 106 to perform needed business logic on the associated DOs 208. In addition, the application program 106 can perform DL/I™ operations (e.g., retrieve, update, delete and insert) using member functions or methods of the BOs 206. The BO 206 will, in turn, invoke the member functions or methods of its corresponding DO 208 to perform actual DL/I calls.

Application Object

The application (APPL) class 212 models the IMS™ environment as an object, and allows the application program 106 to access multiple data sources (i.e., the IMS™ DBMS 110 and the DB2™ RDBMS 114). The application class 212 has two member functions or methods, i.e. initialize( ) and terminate( ).

The initialize( ) method is invoked to ensure that the IMS™ environment is set up correctly, before the application program 106 requests IMS™ or DB2™ services. The initializes method sets an "IMS™ active" attribute, and also sets an "ESAF active" attribute in an AIB (application interface block) control block if there is an active ESAF connection from the IMS™ region to the DB2™ RDBMS 114. These "IMS™ active" and "ESAF active" attributes are used by a JDBC/SQLJ (Java DataBase Connection/Java SQL) driver to determine whether an ESAF attachment to the DB2 RDBMS 114 is active, or whether an RRSAF attachment can be made. The initialize( ) method ensures that only one kind of attachment from the IMS™ environment to the DB2™ RDBMS 114 will be supported. The initialize( ) method of the application object 212 is invoked. Once an attachment has been established to the DB2™ RDBMS 114, the application program 106 uses an ODBC, JDBC, or SQLJ driver to access the DB2™ RDBMS 114.

The terminate( ) method is invoked when the application program 106 terminates. This method resets the indicators for indicating that the IMS™ environment is active and what kind of connection is used between the IMS™ environment and the DB2™ RDBMS 114. The terminate method also cleans up the runtime resources used by ODBC, JDBC, or SQLJ drivers, including any threads that may have been created in the DB2™ RDBMS 114.

Message Queue Object

The message queue (MQ) class 214 models IMS™ Transaction Manager™ input and output message queues as objects. The message queue class 214 includes, among others, "retrieveMsg" and "writeMsg" member functions that allow transactional application programs 106 to retrieve messages from an IMS™ message queue, and then write responses to an originator via the same IMS™ message queue, and/or to another destination via other IMS™ message queues. Both request and response buffers are constructed dynamically by the message queue objects 214.

The message queue objects 214 support both conversational and non-conversational application programs 106 to allow the application programs 106 to selectively access scratch pad area (SPA) data in conversational mode. The message queue objects 214 also allows an output message to be displayed on a formatted screen by optionally supporting the message output descriptor (MOD) on the writeMsg method.

The message queue objects 214 are also capable of supporting multiple message segments. Request buffers are allocated and created dynamically upon demand by application programs 106. Moreover, default sizes are provided for both SPA data and input message data. Therefore, if a buffer size is not specified by the application program 106, the maximum default size will be used.

The same message queue object 214 can also be used to write SPA data and output message data back to the originator. However, output responses can also be written to a different destination by creating a separate message queue object 214 with the specified destination.

Transaction Object

The transaction (TRAN) class 216 models synchpoint processing as objects. In the preferred embodiment, the transaction object 216 provides commit or rollback methods that, in turn, invoke interface-specific methods, e.g., DB2SQLJDriver.coordExternalCommit( ) and DB2SQLJDriver.coordExternalRollback( ) for a JDBC interface.

Application programs 106 are required to invoke the commit or rollback methods of the transaction object 216 before exiting or retrieving a next message from the input message queue object 214. Any attempt to invoke a second retrieveMessage method of the message queue objects 214 without a commit/rollback for the prior message will be rejected. This same check can be made in IMS™ when the application program 106 terminates and, if the application program 106 had not performed the commit, then IMS™ will abend the application program 106.

System Services Object

The system services (SS) class 218 models IMS™ system services as objects. These system services objects 218 simplify the task of issuing system services requests to IMS™ and retrieving system information from IMS™. Generally, the system services class 218 includes a member function for each of the desired system services.

Example Application Program

Following is an example object-oriented application program 106 according to the present invention:

```
// application program
main( )
{
public class SampleApplication extends IMS-provided-
    base-class;
{
    Public static void main(String[ ] argv);
    {
        // Instantiate application object
        SampleApplication appl=new SampleApplication;
        // Invoke the initialize method
        appl.intialize( );
        // Instantiate the message queue object
        MessageQueue mq=new MessageQueue
            (inputMsgBufLen);
        // Retrieve a message from the message queue object
        byte[ ] status=new byte [2];
        byte[ ] inputMsg=mq.retrieveMessage(status);
        // Instantiate the connection object and connect to
            DB2
        Connection con=DriverManager.getConnection( );
        // Build query for DB2
        Statement stmt=con.createStatement( );
        SQLString="SELECT . . . ";
        // Send query to DB2 for execution
        ResultSet rs=stmt.ExecuteQuery (SQLString);
        // Construct DL/I query from DB2 results set
        queryString=ProcessResults (ResultSet);
        // Instantiate query object
        QueryObject query=new QueryObject
            (queryString);
        // Instantiate applview object
        ApplView applV=new ApplView (applicationView);
        // Instantiate iterator object
        Iterator it=applV.evaluate(queryString);
        // Write query String to output message queue
        status=mq.writeMessage(queryString);
        // Instantiate transaction object
        IMSTransaction tran=new IMSTransaction( );
        // Commit the transaction
```

Figure 3:
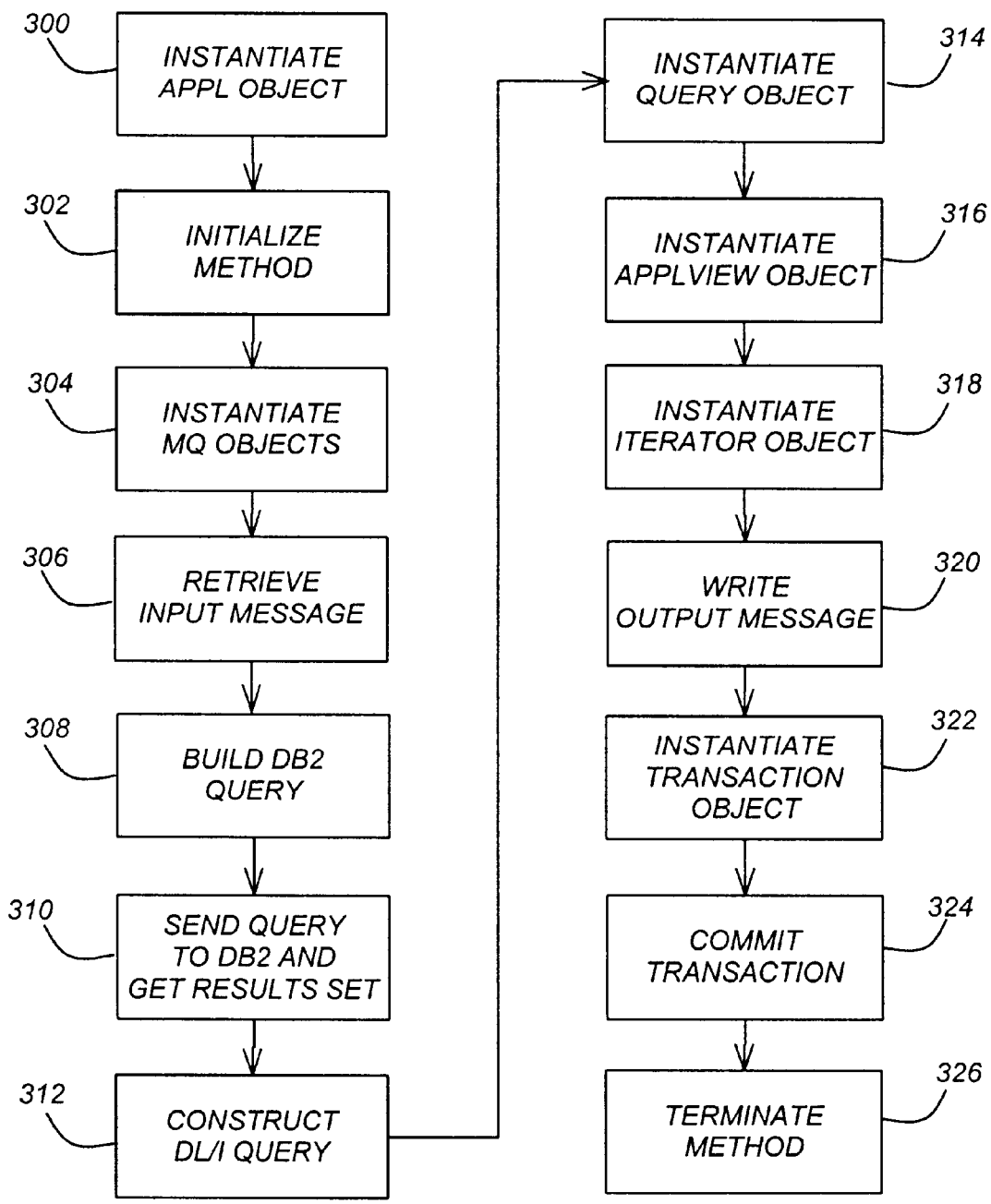
FIG. 3 is a flowchart illustrating the steps performed by the application program and objects framework according to the present invention.

```
tran.commit( );
// Invoke the terminate method
appl.terminate ( );
}
}
```
Logic of the Application Program FIG. 3 is a flowchart illustrating the steps performed by the application program 106 and objects framework 108 according to the present invention.

Block 300 represents the application program 106 instantiating an application object 212 in the memory of the server computer 102.

Block 302 represents the application program 106 invoking the initialize method of the application object 212.

Block 304 represents the application program 106 instantiating message queue objects 214 for the originator (e.g., terminal or program) in the memory of the server computer 102.

Block 306 represents the application program 106 retrieving input from the originator via the message queue object 214.

Block 308 represents the application program 106 constructing a query for the DB2™ RDBMS 114 in the memory of the server computer 102.

Block 310 represents the application program 106 sending the query to the DB2™ RDBMS 114 and obtaining a result set in response.

Block 312 represents the application program 106 constructing a query for the IMS™ DBMS 110 in the memory of the server computer 102.

Block 314 represents the query object 200 of the objects framework 108 being instantiated in the memory of the server computer 102.

Block 316 represents the application program 106 instantiating the requested applView object 202 in the memory of the server computer 102.

Block 318 represents the application program 106 instantiating the iterator object 210 in the memory of the server computer 102 and then setting its object pointer by invoking the "evaluate" method with a DL/I™ query string.

Block 320 represents the application program 108 building a response to the input message from the results of the prior operations and sending the response to the originator via the message queue objects 214.

Block 322 represents the application program 106 instantiating the transaction object 216 in the memory of the server computer 102.

Block 324 represents the application program 106 invoking the commit method of the transaction object 216.

Block 326 represents the application program 106 invoking the terminate method of the application object 212.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other database management systems could be used. For example, the invention need not be restricted to IMS™ and/or DB2™ database management systems. Instead, the present invention could be used with other types of database management systems and databases.

In summary, the present invention discloses a method, apparatus, and article of manufacture for accessing a database. A hierarchical database system is modeled into an objects framework, wherein the objects framework corresponds to one or more application views, database definitions, and data defined and stored in the hierarchical database system. The objects framework also provides mechanisms for accessing a relational database system, wherein the objects framework provides industry-standard interfaces for attachment to the relational database system. Transactions from an application program for both the hierarchical database system and the relational database system are processed through the objects framework using message queue objects.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for accessing a database, comprising:

(a) modeling a hierarchical database system into an objects framework, wherein the objects framework corresponds to one or more application views, database definitions, and data defined and stored in the hierarchical database system;

(b) accessing a relational database system through the objects framework, wherein the objects framework provides industry-standard interfaces for attachment to the relational database system; and (c) processing transactions from an application program for both the hierarchical database system and the relational database system through the objects framework using message queue objects.

2. The method of claim 1, wherein the objects framework creates a new attachment to the relational database system, if the attachment does not exist.

3. The method of claim 1, wherein the objects framework re-uses an existing attachment to the relational database system, if the attachment already exists.

4. The method of claim 1, wherein the objects framework uses objects to model an execution environment for the application program.

5. The method of claim 1, wherein the objects framework provides an application programming interface (API) that allows the application program to invoke commit and rollback functions.

6. The method of claim 1, wherein the objects framework provides objects used by the application program to perform explicit synchpoint processing.

7. The method of claim 1, wherein a transaction class of the objects framework models transactions as objects.

8. The method of claim 7, where the transaction class of the objects framework includes member functions for performing commit and rollback requests.

9. The method of claim 8, wherein the application program is required to invoke the member functions for performing the commit and rollback requests before exiting.

10. The method of claim 8, wherein the application program is required to invoke the member functions for performing the commit and rollback requests before retrieving a next message from an input message queue object.

11. A computerized apparatus for accessing a database, comprising:

(a) means for modeling a hierarchical database system into an objects framework, wherein the objects framework corresponds to one or more application views, database definitions, and data defined and stored im the hierarchical database system;

(b) means for accessing a relational database system through the objects framework, wherein the objects framework provides industry-standard interfaces for attachment to the relational database system; and (c) means for processing transactions from an application program for both the hierarchical database system and the relational database system through the objects framework using message queue objects.

12. The apparatus of claim 11, wherein the objects framework creates a new attachment to the relational database system, if the attachment does not exist.

13. The apparatus of claim 11, wherein the objects framework re-uses an existing attachment to the relational database system, if the attachment already exists.

14. The apparatus of claim 11, wherein the objects framework uses objects to model an execution environment for the application program.

15. The apparatus of claim 11, wherein the objects framework provides an application programming interface (API) that allows the application program to invoke commit and rollback functions.

16. The apparatus of claim 11, wherein the objects framework provides objects used by the application program to perform explicit synchpoint processing.

17. The apparatus of claim 11, wherein a transaction class of the objects framework models transactions as objects.

18. The apparatus of claim 17, wherein the transaction class of the objects framework includes member functions for performing commit and rollback requests.

19. The appararas of claim 18, wherein the application program is required to invoke the member functions for performing the commit and rollback requests before exiting.

20. The apparatus of claim 18, wherein the application program is required to invoke the member functions for performing the commit and rollback requests before retrieving a next message from an input message queue object.

21. An article of manufacture embodying logic for accessing a database, the logic comprising:

(a) modeling a hierarchical database system into an objects framework wherein the objects framework corresponds to one or more application views, database definitions, and data defined and stored in the hierachical database system;

(b) accessing a relational database system through the objects framework, wherein the objects framework provides industry-standard interfaces for attachment to the relational database system; and (c) processing transactions from an application program for both the hierarchical database system and the relational database system through the objects framework using message queue objects.

22. The article of manufacture of claim 21, wherein the objects framework creates a new attachment to the relational database system, if the attachment does not exist.

23. The article of manufacture of claim 21, wherein the objects framework re-uses an exiting attachment to the relational database system, if the attachment already exists.

24. The article of manufactare of claim 21, wherein the objects framework uses objects to model an execution environment for the application program.

25. The article of manufacture of claim 21, wherein the objects framework provides an application programming interface (API) that allows the application program to invoke commit and rollback functions.

26. The article of manufacture of claim 21, wherein the objects framework provides objects used by the application program to perform explicit synchpoint processing.

27. The article of manufacture of claim 21, wherein a transaction class of the objects framework models transactions as objects.

28. The article of manufacture of claim 27, wherein the transaction class of the objects framework includes member functions for performing commit and rollback requests.

29. The artcle of manufacture of claim 28, wherein the application program is required to invoke the member functions for performing the commit and rollback requests before exiting.

30. The article of manufacture of claim 28, wherein the application program is required to invoke the member functions for performing the commit and rollback requests before retrieving a next message from an input message queue object.

* * * * *

UNITED STATES PATENT AND TRADEMARK OFFICE
CERTIFICATE OF CORRECTION

PATENT NO. : 6,539,398 B1 Page 1 of 1
DATED : March 25, 2003
INVENTOR(S) : Richard G. Hannan, Syh-Mei Fang Ho and Vern L. Watts It is certified that error appears in the above-identified patent and that said Letters Patent is hereby corrected as shown below:

<u>Column 12,</u>
Line 56, "where" should read -- wherein- --

<u>Column 13,</u>
Line 4, "im" should read -- in --

Signed and Sealed this

Twelfth Day of August, 2003

JAMES E. ROGAN
*Director of the United States Patent and Trademark Office*